March 17, 1964    L. H. LEONARD, JR    3,124,938
ABSORPTION REFRIGERATION SYSTEMS AND METHOD OF OPERATION
Filed May 27, 1960    8 Sheets-Sheet 1

INVENTOR.
LOUIS H. LEONARD JR.
BY
ATTORNEY.

March 17, 1964 L. H. LEONARD, JR 3,124,938
ABSORPTION REFRIGERATION SYSTEMS AND METHOD OF OPERATION
Filed May 27, 1960 8 Sheets-Sheet 3

INVENTOR.
LOUIS H. LEONARD JR.
BY
ATTORNEY.

March 17, 1964 L. H. LEONARD, JR 3,124,938
ABSORPTION REFRIGERATION SYSTEMS AND METHOD OF OPERATION
Filed May 27, 1960 8 Sheets-Sheet 4

INVENTOR.
LOUIS H. LEONARD JR.
BY
*Herman Seid*
ATTORNEY.

March 17, 1964  L. H. LEONARD, JR  3,124,938
ABSORPTION REFRIGERATION SYSTEMS AND METHOD OF OPERATION
Filed May 27, 1960  8 Sheets-Sheet 5
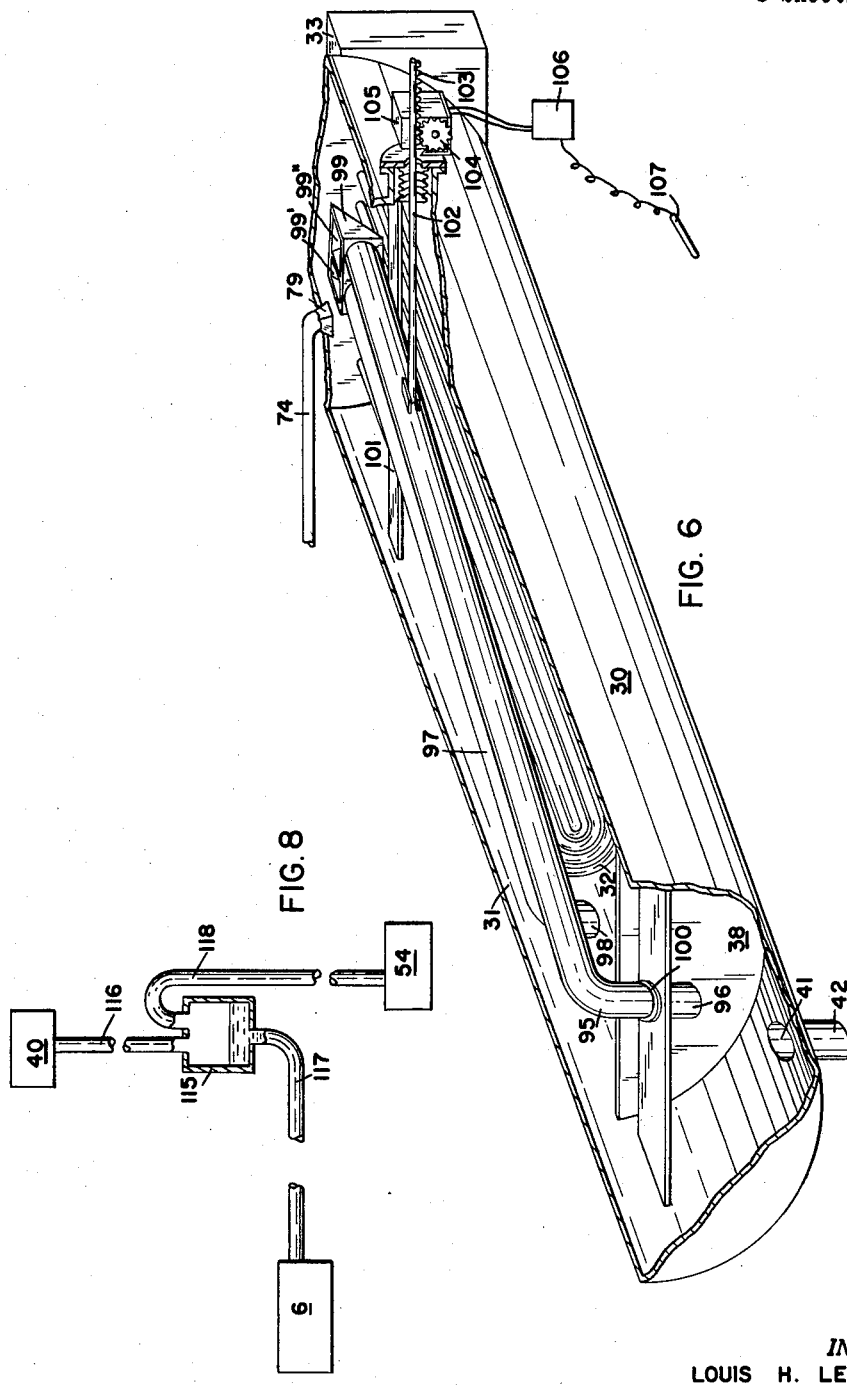
INVENTOR.
LOUIS H. LEONARD JR.
BY
ATTORNEY.

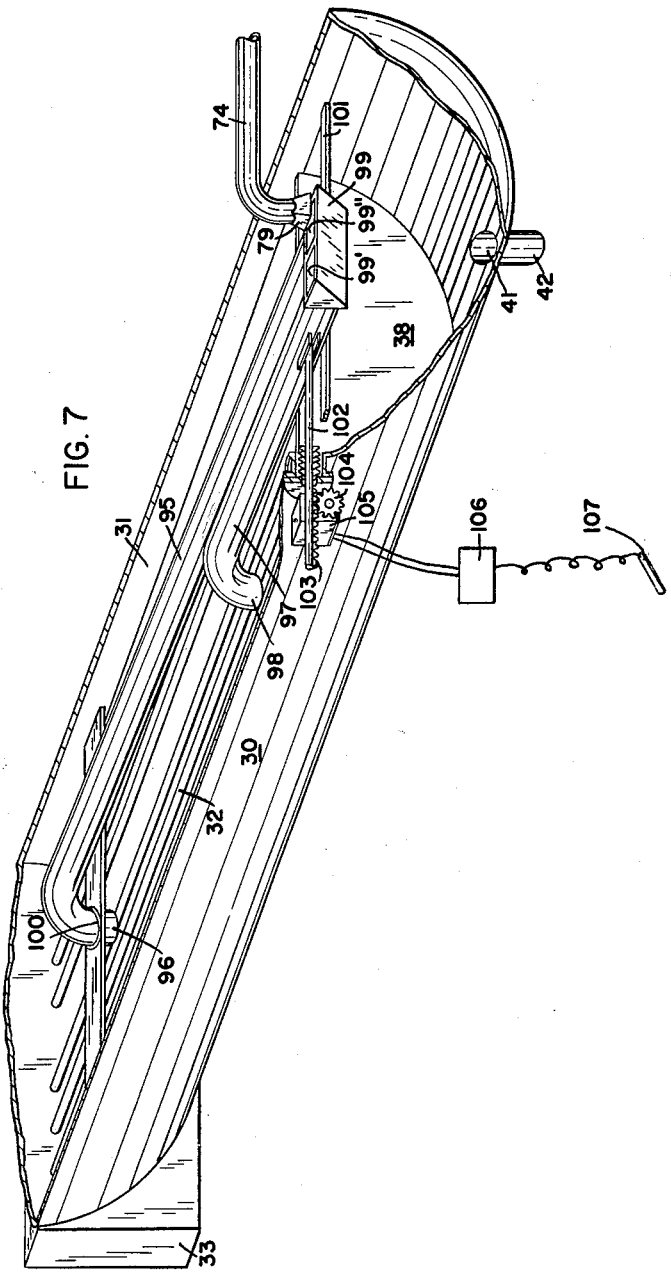

INVENTOR.
LOUIS H. LEONARD JR.
BY
ATTORNEY.

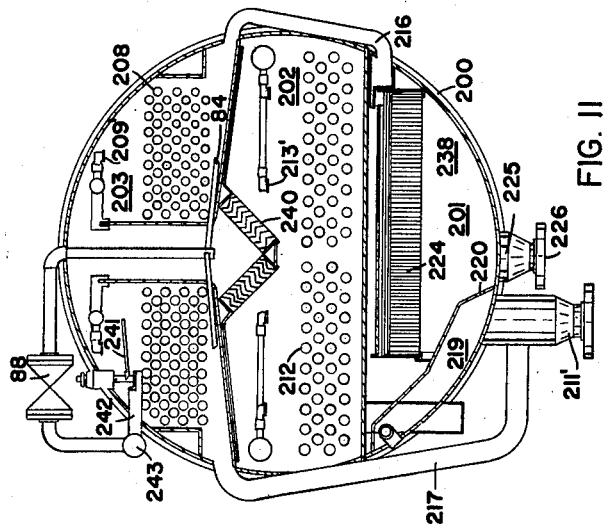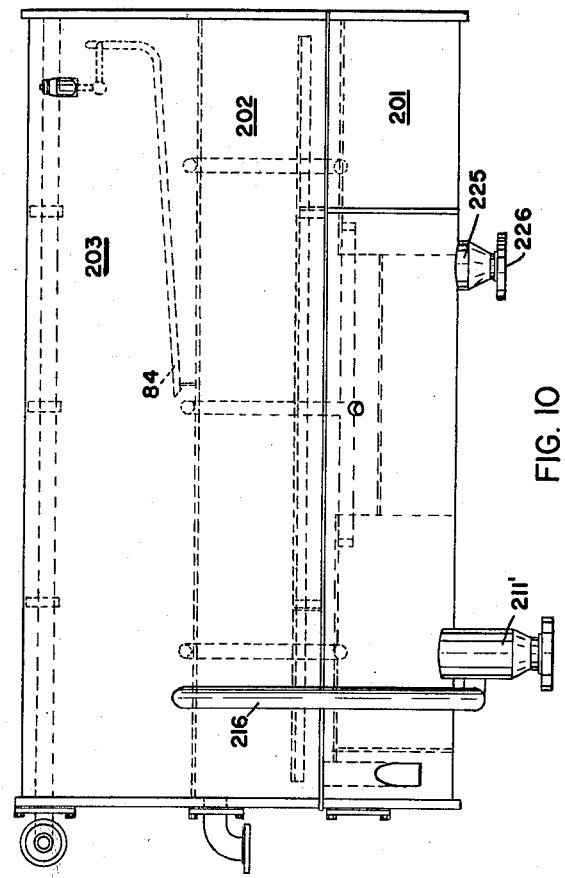

United States Patent Office 3,124,938
Patented Mar. 17, 1964

3,124,938
ABSORPTION REFRIGERATION SYSTEMS AND
METHOD OF OPERATION
Louis H. Leonard, Jr., Dewitt, N.Y., assignor to Carrier
Corporation, Syracuse, N.Y., a corporation of Delaware
Filed May 27, 1960, Ser. No. 32,452
39 Claims. (Cl. 62—103)

This invention relates to absorption refrigeration systems and, more particularly, to absorption refrigeration systems including a flash-type heat exchanger for weak and strong solutions, and to a method of operating absorption refrigeration systems.

The chief object of the present invention is to provide a compact, light-weight absorption refrigeration system employing a flash-type heat exchanger for strong and weak solutions.

An object of the invention is to provide an absorption refrigeration system employing lithium bromide as an absorbent in which solidification or precipitation of lithium bromide salt does not interfere with machine operation. It (solidification) may occur in the generator and the heat exchanger on the strong solution side, but such solidification does not interfere with machine operation. Solution circulation in the absorber is practically solidification proof during operation thus eliminating the necessity for providing entering condensing water temperature controls and cooling tower bypasses in order to regulate the temperature of the condensing water employed in this system. This is essential on other types and designs of absorption refrigeration machines employing lithium bromide solutions.

A further object of the invention is to provide an absorption refrigeration system employing a greatly reduced solution charge when compared with systems of similar capacity heretofore employed.

A still further object is to provide an absorption refrigeration system in which the violent flashing of strong solution in the absorber is prevented, thus eliminating possible carry-over.

A still further object is to provide a light-weight absorption refrigeration system in which the concentration range in the absorber is increased without increasing steam pressure requirements in the generator resulting in increased system capacity or, if desired, less absorber heat exchange surface.

A still further object is to provide an absorption refrigeration system employing a refrigerant economizer, as a means for increasing capacity and improving the steam rate.

A still further object is to provide an improved method of operation of an absorption refrigeration system. Other objects of the invention will be readily perceived from the following description.

This invention relates to an absorption refrigeration system which comprises, in combination, a generator, a condenser, an absorber, means for heating weak solution in the generator to form refrigerant vapor and strong solution, the generator being in communication with the condenser so that refrigerant vapor created therein passes to the condenser, a refrigerant evaporator in communication with the condenser to receive condensate therefrom, condensate in the evaporator being flash-cooled, the flashed vapor created in the evaporator passing to the absorber to be absorbed by solution therein, a solution evaporator in communication with the generator to receive strong solution therefrom, and a second absorber having a pressure therein intermediate the pressures in the generator and the first absorber, pressure in the solution evaporator being substantially the same as pressure in the second absorber, vapor created in the solution evaporator passing to the second absorber to be absorbed by solution therein, the second absorber being in communication with the first absorber to receive solution therefrom and in communication with the generator to supply solution thereto.

This invention further relates to a method of operation of an absorption refrigeration system in which the steps consist in placing weak solution in the generator in heat exchange relation with a heating medium to vaporize refrigerant from the solution thus forming a strong solution, forwarding the vapor to a condenser, condensing the vapor, forwarding the refrigerant condensate to an evaporator at a pressure less than the pressure in the condenser, flash-cooling the condensate in the evaporator, vapor formed in the evaporator passing to an absorber to be absorbed by solution therein, placing the cooled liquid refrigerant in heat exchange relation with a medium to be cooled, forwarding strong solution from the generator to a solution evaporator at a pressure less than generator pressure, flash-cooling the solution in the solution evaporator, mixing the flash-cooled solution with absorber solution, vapor from the solution evaporator passing to a second absorber, forwarding solution from the first absorber to the second absorber to absorb vapor from the solution evaporator thus forming weak solution, and forwarding the weak solution to the generator.

The attached drawings illustrate preferred embodiments of the invention in which:

FIGURE 6 is a respective view of the generator, partially broken away to illustrate the control arrangement;

FIGURE 7 is a perspective view, similar to FIGURE 6, illustrating a modified control arrangement;

FIGURE 8 is a diagrammatic view illustrating a refrigerant economizer;

FIGURE 10 is a view in elevation of a modified absorber-evaporator-flash tank shell assembly; and FIGURE 11 is a sectional view of the assembly shown in FIGURE 10.

Figure 1:
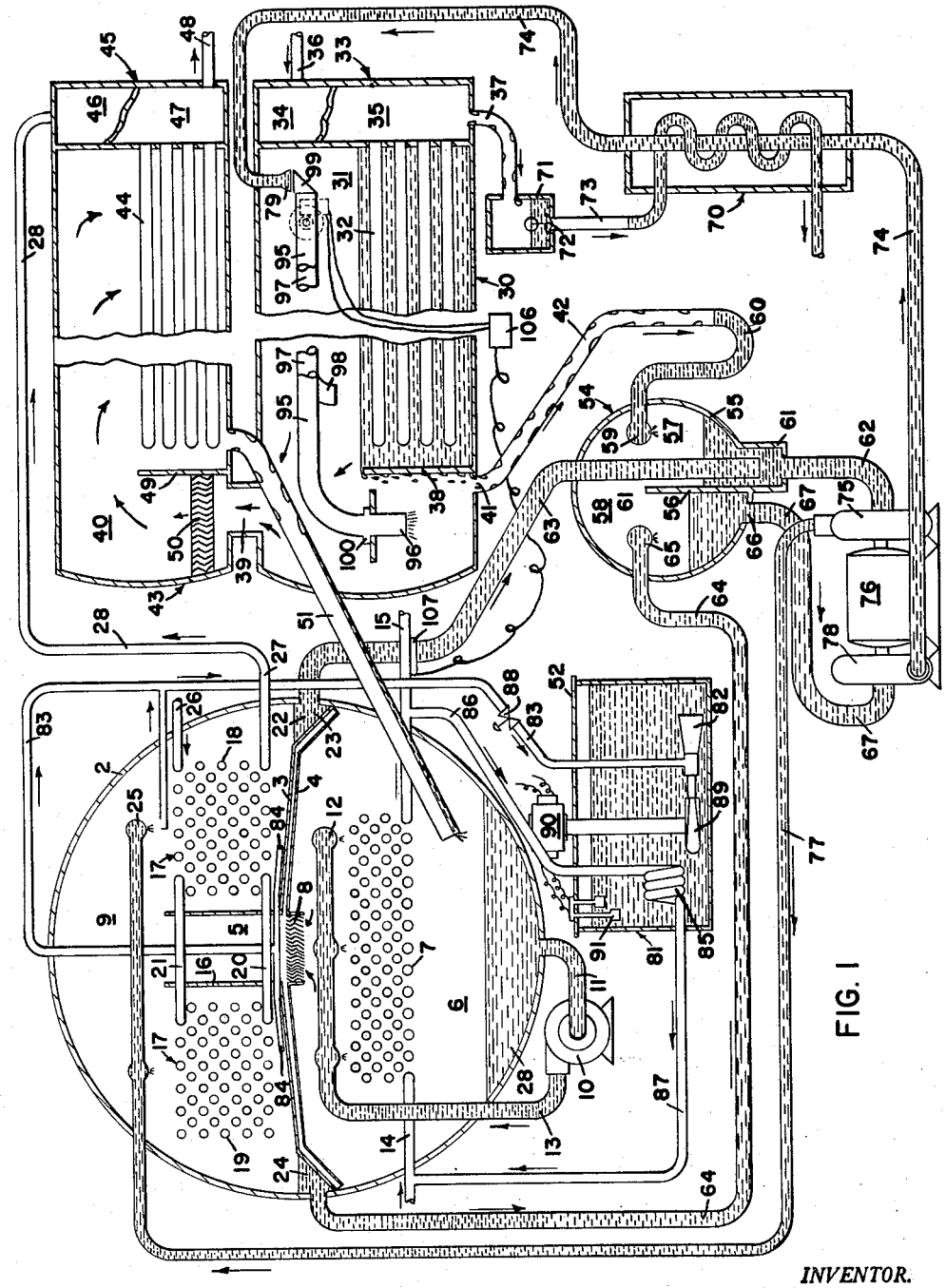
FIGURE 1 is a diagrammatic view illustrating the absorption refrigeration system of the present invention.

The attached drawings illustrate the absorption refrigeration system of the present invention. Referring to FIGURES 1, 3, 4 and 5, there is shown a shell 2, preferably divided in two chambers by a partition 3 including a baffle 4 serving to insulate thermally the lower chamber from the upper chamber. An opening 5 exists between the two chambers to permit vapor to flow from the lower chamber to the upper chamber.

The lower chamber forms an evaporator 6. Placed in evaporator 6 are a plurality of tubes 7 through which medium to be cooled is passed. Refrigerant supplied to evaporator 6 is flash-cooled upon discharge therein, the flashed vapor passing through eliminators 8, placed at the opening 5, to the upper chamber which forms an absorber 9.

Flash-cooled liquid refrigerant collects in a sump 28 in the bottom of evaporator 6 and is recirculated about the evaporator by pump 10, pump 10 being connected to the sump 28 of evaporator 6 by line 11 and to spray nozzles 12 placed in the upper part of the evaporator above tubes 7 through line 13. Thus, liquid refrigerant is removed from the bottom of the evaporator and discharged over tubes 7 in heat exchange relation with medium to be cooled passing therethrough. Liquid refrigerant, of course, evaporates when it is placed in heat exchange relation with the medium to be cooled, the vapor passing through eliminators 8 and opening 5 to the absorber 9.

Medium to be cooled is forwarded by a pump (not shown) through line 14 to the tubes 7 of evaporator 6. The cooled medium leaves the tubes 7 through line 15 and is forwarded to a place of use such as the central station of an air conditioning system. The medium, after passing through the central station, returns to the evaporator 6 through line 14 to be again cooled and reused.

Opening 5 extends longitudinally of shell 2 and is surrounded by baffles 16 which assure that solution in the absorber cannot flow to evaporator 6. A tube bundle 17 is placed in the absorber to cool solution therein. Preferably, the tube bundle 17 is formed in two sections, 18, 19 connected by lines 20 and 21. A sump 22 is provided in the absorber, sump 22 being formed in two sections 23, 24, for a purpose hereinafter explained. Spray nozzles 25 are provided in the absorber to spray solution over the tube bundle 17. The manner in which solution enters and leaves the absorber 9 will be explained hereinafter.

Condensing water enters the interior of the tubes in tube bundle 17 through line 26 and leaves tube bundle 17 through line 27 being forwarded to the condenser through line 28, as hereinafter explained.

The term "weak solution" is used herein to describe a solution weak in absorbing power. The term "strong solution" is used herein to define a solution strong in absorbing power.

The preferred absorbing solution is a solution of lithium bromide in water. The preferred refrigerant is water. Concentration of solution leaving the generator may vary, but preferably is about 66% during full load operation of the system.

A second shell 30 forms a generator or boiler 31. A plurality of U-shaped tubes 32 extend roughly three-quarters of the length of the shell 30. Tubes 32 are connected to a steam chest 33 formed in two parts 34, 35 to permit steam to be supplied to the tubes and to permit steam condensate to be collected in section 35 of steam chest 33. Steam enters section 34 of steam chest 33 through line 36. Steam condensate is removed from section 35 of steam chest 33 through line 37.

A weir 38 divides the generator 31 in two sections. Weir 38 assures that, during full load operation, tubes 32 are covered with solution. During operation, weak solution is supplied to the generator 31, placed in heat exchange relation with steam in tubes 32, refrigerant boiling off and passing through a conduit 39 to a condenser 40. Strong solution passes from the generator 31 through outlet 41 connected to line 42, for a purpose hereinafter explained.

Condenser 40 is formed by a shell 43. A plurality of U-shaped tubes 44 extend longitudinally in the shell 43 for approximately three-quarters of the longitudinal length of shell 43. Tubes 44 are connected to a water box 45 having a section 46 for entering condensing water and a section 47 for leaving condensing water. Section 46 is connected by line 28 and line 27 to the interior of the tubes of tube bundle 17 so that condensing water passes through the tubes of absorber 9 and then passes through the tubes 44 of condenser 40 leaving water box section 47 through line 48.

A baffle 49 is placed in condenser 40 to assure that vapor entering the condenser through conduit 39 passes upwardly in the condenser and downwardly through the tubes 44 being condensed by the heat exchange relation with the condensing water; baffle 49 also assures that refrigerant condensate cannot pass to generator 31. Preferably, eliminators 50 are placed in condenser 40 adjacent conduit 39 to assure that drops of solution in the generator are not splashed or carried by the refrigerant vapor into the condenser.

Refrigerant condensate leaves condenser 40 through line 51 and is discharged in evaporator 6, being flash-cooled upon discharge therein, as previously described. It will be appreciated that line 51 is not filled with condensate, line 51 being sized to permit noncondensibles collected in the condenser to pass to the evaporator and to pass from the evaporator to the absorber where they are collected, as hereinafter described.

It will be appreciated that during operation of the system, the generator and the condenser are at substantially the same vapor pressure, approximately three inches mercury absolute at full load. It will be understood, of course, it may be substantially lower during partial load operation. The vapor pressure of the evaporator and absorber is substantially the same, being about one-quarter inch mercury absolute. Thus, it will be understood that pressures in the generator and condenser are considerably greater than pressures in the absorber and evaporator at full load.

A flash tank 54 is provided which, during operation of the system, is at a pressure intermediate the pressures of the absorber-evaporator and generator-condenser. Preferably, the vapor pressure in the flash tank is about one inch mercury absolute at full load. Flash tank 54 includes a shell 55 containing a weir or partition 56 which separates flash tank 54 into a solution evaporator 57 and a second absorber 58. Spray nozzles 59 are provided in solution evaporator 57 and are connected to line 42 in order that strong solution returning from the generator through line 42 may be discharged in the solution evaporator. Preferably, a loop 60 is provided in line 42 to maintain a liquid pressure seal between the solution evaporator and the generator.

Strong solution discharged in solution evaporator 57 through nozzles 59 flashes upon discharge, the flashed vapor passing through the opening or space 61 between the solution evaporator 57 and the second absorber 58 to be absorbed by solution in second absorber 58.

It will be appreciated, if desired, that the solution evaporator and the second absorber may be placed in separate shells so long as communication is provided therebetween to permit vapor to pass from the solution evaporator to the second absorber. However, for economy of manufacture, it is preferred to place both in the single shell 55.

Flashed strong solution leaves the solution evaporator through outlet 61 and line 62, as hereinafter explained. The solution evaporator 57 is connected to the sump section 23 of absorber 9 by line 63 so that weak solution leaving the evaporator is discharged in solution evaporator 57 and immediately mixes with the flash-cooled strong solution returning from the generator, the mixture of solutions leaving the solution evaporator through outlet 61 and line 62, as previously described.

Second absorber 58 is connected to sump section 24 of the sump 22 of absorber 9 by line 64, for a purpose hereinafter described. Weak solution flows from the absorber 9 through line 64 to the second absorber 58, being discharged therein through spray nozzles 65, the discharged weak solution serving to absorb vapor created by the flash-cooling of strong solution in solution evaporator 57, and being further diluted by the additional refrigerant vapor absorption. The weak solution carrying the absorbed refrigerant vapor leaves second absorber 58 through outlet 66 and line 67 as hereinafter described.

A heat exchanger 70 is provided between steam condensate and weak solution passing to the generator. Steam condensate leaving section 35 of steam chest 33 is collected in a chamber 71 in which is placed a float valve 72 controlling the flow of steam condensate therefrom. Chamber 71 is connected to heat exchanger 70 by line 73. Weak solution is forwarded to generator 31 through line 74; thus, the steam condensate supplied to heat exchanger 70 through line 73 is placed in heat exchange relation with weak solution passing to the generator through line 74. This heat exchanger is important in the present invention since, it subcools the steam condensate while preheating weak solution going to the generator. This substantially improves the overall steam rate of the machine. This is of particular importance since with the flash tank previously described, the system may be somewhat less efficient than systems presently employed in the industry. However, when this heat exchanger is provided, the machine is more efficient so that while cycle efficiency may be less, actual operating costs in cases where the steam condensate is not returned directly to a boiler will be better than with conventional type solution heat exchangers.

Considering the flow of solution in the system, weak solution flows from sump section 23 through line 63 and is discharged in solution evaporator 57 where it immediately mixes with the flash-cooled strong solution returning from the generator. The mixture of solutions then leaves solution evaporator 57 through outlet 61 and line 62 induced by pump 75, actuated by motor 76, and is forwarded by pump 75 through line 77 to the absorber spray nozzles 25. The recirculated mixture of solutions is discharged through nozzles 25 and serves to absorb refrigerant vapor flowing to the absorber from the evaporator, the weak solution so formed collecting in sump 22. It will be appreciated since the strong solution has been flash-cooled in the solution evaporator and immediately mixed with weak solution, violent flashing of the solution in the absorber is prevented.

Weak solution collected in sump section 24 of absorber 9, leaves absorber 9 through line 64 and is discharged in the second absorber 58 through nozzles 65. The discharged weak soltuion absorbs the vapor created in the solution evaporator and leaves second absorber 58 through outlet 66 and line 67 being induced thereto by pump 78, also actuated by motor 76. If desired, of course, separate pumps and motors may be provided.

Weak solution containing the additional absorbed refrigerant vapor is forwarded by pump 78 through line 74 to heat exchanger 70 where it is placed in heat exchange relation with steam condensate leaving the generator 31. In heat exchanger 70, the weak solution is preheated while the steam condensate is cooled. Line 74 is connected to an outlet 79 in generator 31 to permit the solution to be discharged therein over the tubes 32 in heat exchange relation with heating medium in the tubes. The manner of discharge will be explained hereinafter.

Weak solution in the generator is placed in heat exchange relation with steam in tubes 32, the solution boiling off refrigerant vapor, refrigerant vapor passing through conduit 39 to condenser 40 while the strong solution so formed overflows weir 38 and leaves generator 31 through outlet 41 and line 42, being discharged through nozzles 59 in the solution evaporator 57. A loop 60 is formed in line 42, as previously described, to assure a liquid pressure seal between the generator and the solution evaporator 57. Since the pressure in solution evaporator 57 is less than the pressure in generator 31, strong solution discharged therein through nozzles 59 is flash-cooled, the flash-cooled strong solution immediately mixing with weak solution therein, as previously described, while the vapor so formed passes through opening 61 to the second absorber 48 and is absorbed by solution therein.

Figure 2:
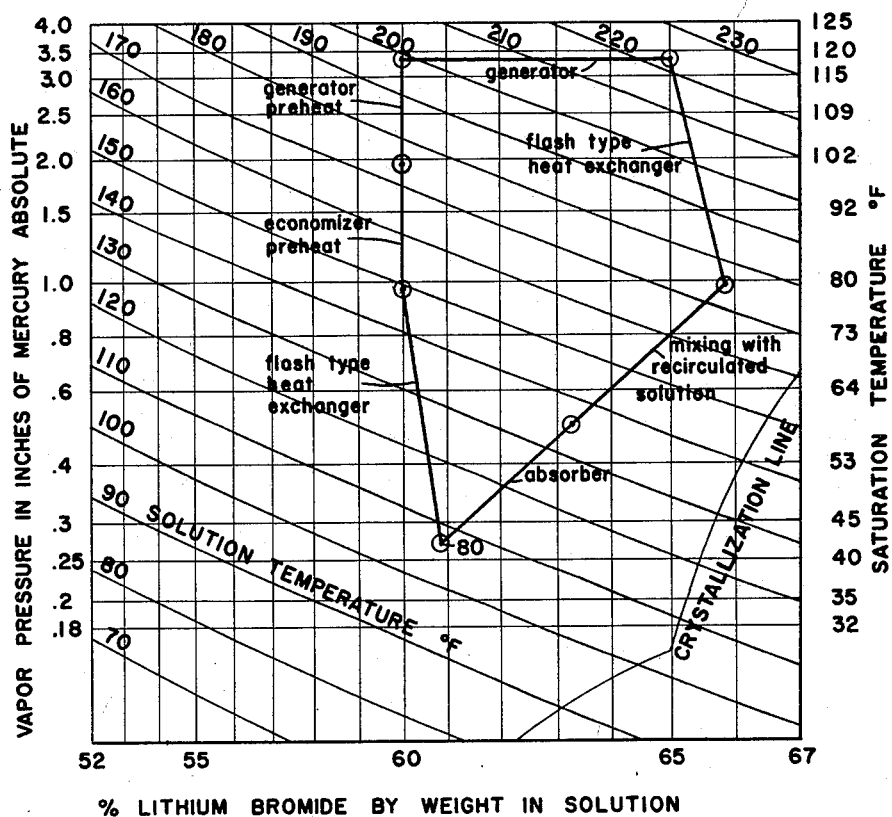
FIGURE 2 is a cycle diagram illustrating operation of the absorption refrigeration system of FIGURE 1 at full load.
Figure 3:
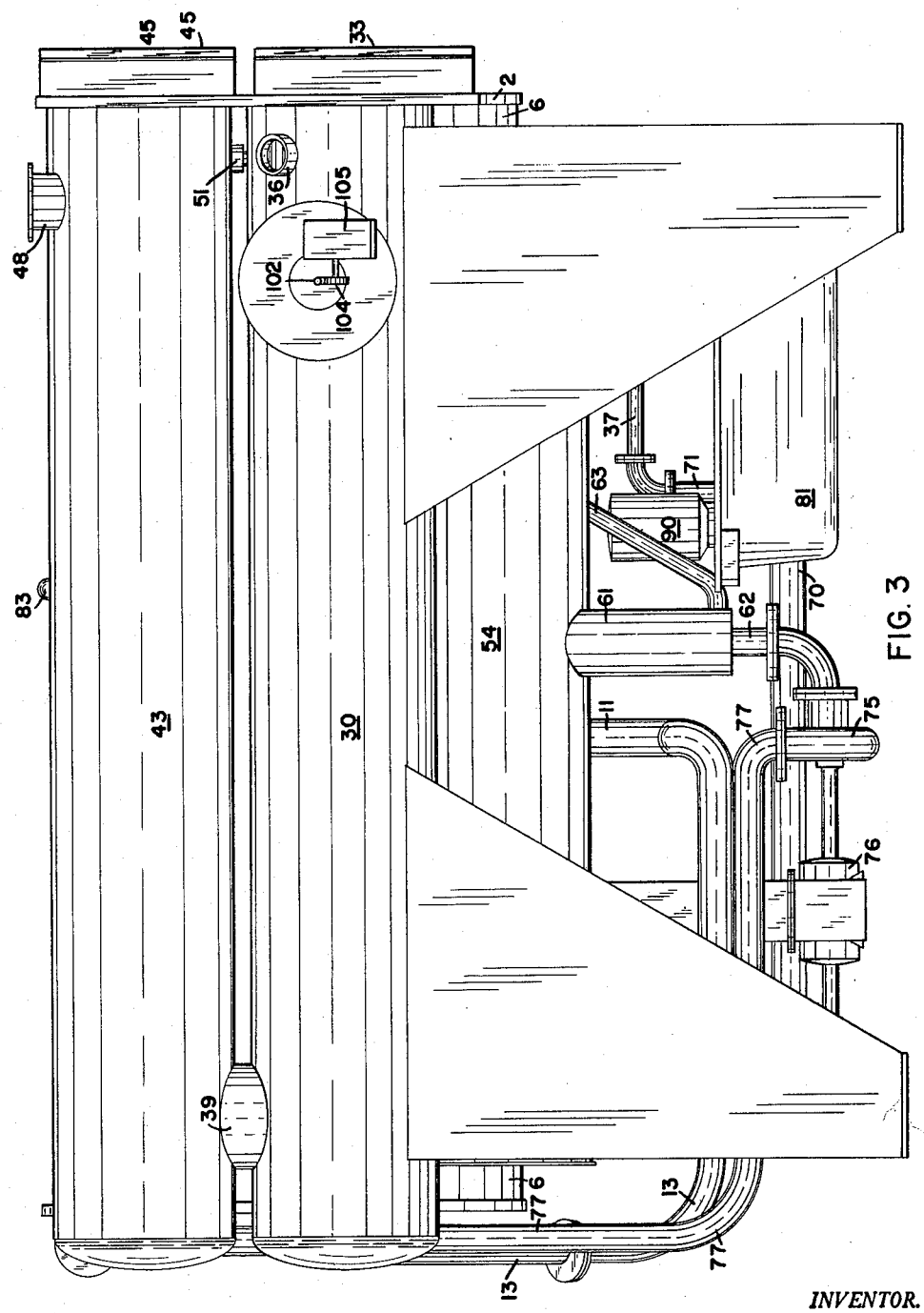
FIGURE 3 is a view in elevation of the absorption refrigeration system.
Figure 5:
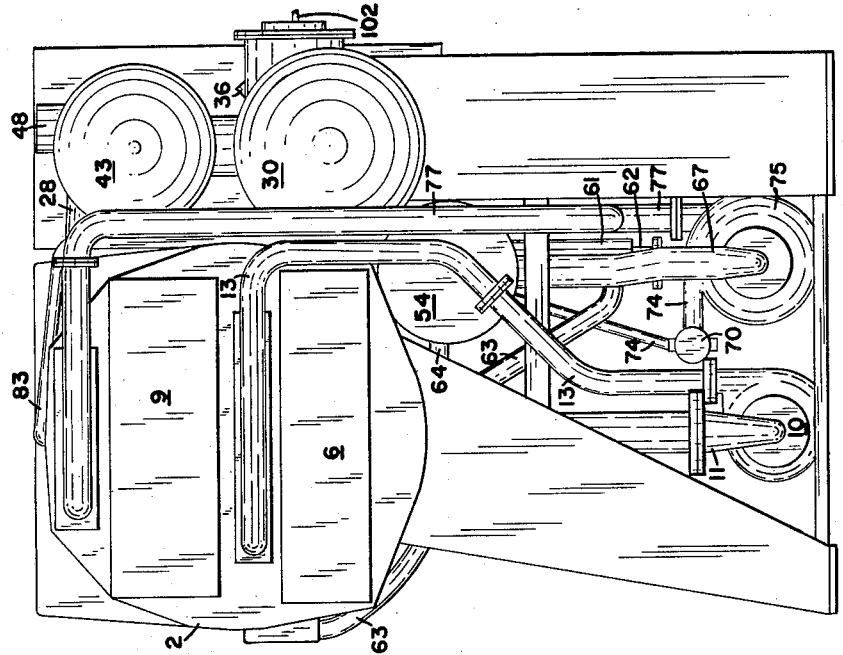
FIGURE 5 is a view in elevation of the opposite end of the absorption refrigeration system from that illustrated in FIGURE 4.
Figure 4:
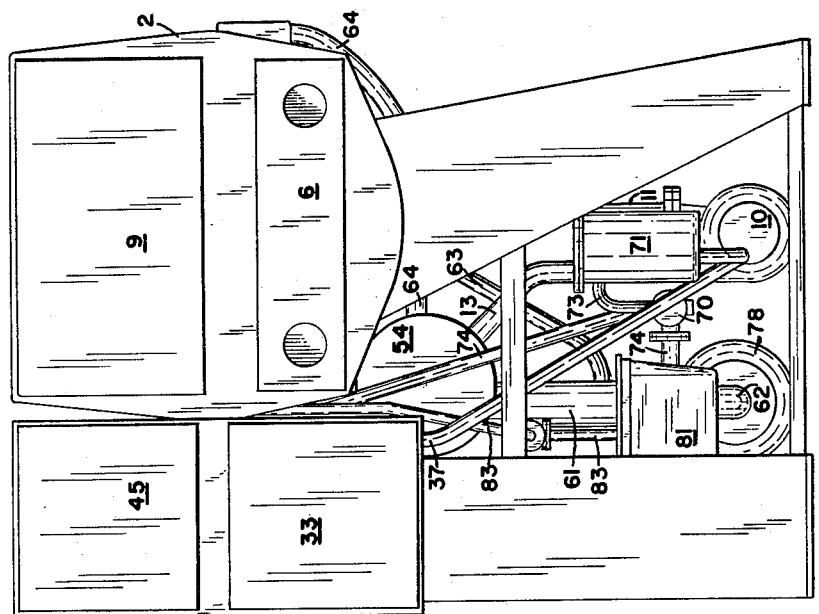
FIGURE 4 is a view in elevation of an end of the absorption refrigeration system.

The temperatures and concentrations of solution during its passage through the system may be further explained by reference to FIGURE 2 which illustrates a cycle diagram of the absorption refrigeration system. The cycle diagram will be considered from the point where weak solution leaves the absorber, indicated at 80. It will be observed that solution as it leaves the absorber is at a concentration of about 60.8% and at a temperature of approximately 105° F. During its passage through the flash tank 54, the solution increases in temperature to about 150° F. while the concentration of solution, due to the absorption of refrigerant vapor, decreases to about 60%. Solution passing through the heat exchanger 70 increases in temperature to about 175° F., the concentration remaining substantially unchanged, the solution entering the generator at approximately that temperature and at a concentration of about 60%. Initially, in the generator the solution is further preheated to a temperature of about 198° F. and during its passage through the generator increases in temperature to about 220° F. and a concentration of about 65%. Strong solution leaves the generator and is discharged within the solution evaporator, the discharge of solution in the evaporator flash-cooling the solution so that the temperature of the solution decreases to about 172° F. while its concentration increases to about 65.8%. Mixing with the recirculated weak solution in the solution evaporator 57, decreases the concentration of the solution to about 63.4% while also decreasing the temperature of the solution to approximately 136° F. In its passage through the absorber, the solution by the absorption of vapor from the evaporator further decreases in concentration to approximately 60.8%, the concentration of solution leaving the absorber, while the solution decreases in temperature to approximately 105° F.

Referring again to FIGURE 1, as previously described, refrigerant is recirculated about the evaporator by pump 10 and is discharged over the tube 7 therein in heat exchange relation with medium to be cooled passing through the tubes 7. The heat exchange relation between the refrigerant and the medium to be cooled, vaporizes the refrigerant, the evaporated refrigerant (refrigerant vapor) passing through opening 5 into the absorber where it is absorbed by solution therein.

It will be appreciated that refrigerant vapor is boiled off in the generator 31, the flashed vapor passing through conduit 39 to condenser 40; the flashed vapor is condensed therein by being placed in heat exchange relation with condensing water passing through tubes 44. The refrigerant condensate then returns through line 51 to evaporator 6 and is discharged therein, flash-cooling upon discharge, the cooled liquid refrigerant collecting in sump 28 and being recirculated about the evaporator for discharge over tubes 7 while the flashed vapor passes through the tubes and through opening 5 to the absorber to be absorbed by solution therein. It will be appreciated if desired, refrigerant condensate may be discharged over tubes 7 rather than being discharged over the sump of the evaporator.

Condensing water is forwarded by a pump (not shown) through line 26 to the tube bundle 17 of absorber 9. Condensing water after its passage through the tube bundle 17, leaves the absorber through line 27 and line 28 and enters the water box 45 of condenser 40, passing through the tubes 44 therein and leaving the water box 45 through line 48.

Preferably, steam is employed as a heating medium in the generator although, it will be appreciated other heating mediums may be employed if desired such as hot liquids, etc. Steam, of course, may be provided at any desired pressure, however, it is preferred that steam be provided to the generator at a pressure of about 12 pounds since this is the usual pressure at which steam is commercially provided and eliminates the use of regulating valves in the steam line from the boiler. It will be understood, of course, that a regulating valve may be provided, if desired.

Steam is provided from a steam boiler (not shown) through line 36 to section 34 of steam chest 33. The steam passes from section 34 through the U-shaped tubes 32 in heat exchange relation with solution in the generator, refrigerant vapor being boiled from the solution and the steam being condensed. Steam condensate collects in section 35 of steam chest 33 and passes through line 37 to chamber 71. Condensate passes from chamber 71 through line 73 to heat exchanger 70 where it is placed in heat exchange relation with weak solution passing to the generator through line 74, as previously described and is returned to the boiler, if desired.

A purge arrangement 81 is provided to purge non-condensible gases from the absorption refrigeration system. The ejector 82 of purge arrangement 81 is connected by line 83 to purge lines 84 extending in the absorber 9. The cooling coil 85 of purge arrangement 81 is connected to line 15 by line 86 and to line 14 by line 87 permitting cooled medium to be employed for cooling solution in the purge tank 52. A valve 88 is placed in line 83 to permit the purge arrangement to be closed so far as the system is concerned when the system is shut down. Ejector 82 is actuated by means of pump 89, actuated by motor 90. Probes 91 regulate the level of solution in the purge arrangement 81. Purge arrangement 81 is disclosed and claimed in Leonard Patent No. 2,940,273, granted June 14, 1960, and reference is made to such patent for a more complete description of the purging arrangement.

Considering the control arrangement (refer to FIGURE 6) for the present absorption refrigeration system, a pipe 95 is provided in the generator which extends from one end of the generator adjacent steam chest 33 over the weir 38 and has its outlet 96 disposed above the outlet 41 of the generator. A second pipe 97 is attached to pipe 95 and extends from the end of the generator adjacent steam chest 33 to a point adjacent weir 38; practically pipe 97 has its outlet 98 disposed a distance from the end of the generator about three-quarters of the length of the U-shaped tubes 32. Pipes 95, 97 are connected to a box-like member 99, divided into two sections 99', 99", adjacent the outlet 79 of weak solution line 74. Pipes 95, 97 are pivoted, as shown at 100.

As best shown in FIGURE 6, a support 101 is provided for the pipes. A rod 102 is attached to the pipes and is adapted to be reciprocated by means of a rack 103 and gear 104, actuated by a motor 105. The motor is a reversible motor and is energized by means of a control 106 responsive to the temperature of chilled medium leaving the evaporator as indicated by a bulb 107.

Thus, under normal conditions of operation, all weak solution flowing to the generator is discharged in one end of the generator through outlet 79. However, as the temperature of chilled water leaving the evaporator begins to decrease, as sensed by bulb 107, motor 105 is actuated to move box-like member 99 so that some portion of the discharged solution flows through section 99' into pipe 97, thus discharging such portion of the solution adjacent the far end of the U-shaped tubes 32 so that such portion of the discharged solution does not flow through the length of the tubes 32 in heat exchange relation with steam therein. If the temperature continues to decrease, motor 105 is again actuated to move the box-like member 99 so that some solution discharges through section 99" into pipe 95, bypassing such portion of the solution about the generator tubes and discharging the solution in a place in the generator where it can not come into contact with the heating medium.

It will be understood that weak solution flow to the generator is substantially constant under all load conditions. However, some portion of the weak solution discharged in the generator may bypass the tubes therein, thus permitting salt to crystallize from solution in the generator. Generally speaking, only enough solution is passed in heat exchange relation with the heating medium for reconcentration as is required to keep the absorber solution at the desired concentration to meet load requirements.

Although the generator may produce extremely high concentrations of salt under part load conditions, heretofore considered unsafe due to crystallization problems, the highly concentrated salt solution leaving the generator is immediately diluted with weak solution in the solution evaporator so that no problems of crystallization exist in the present system. It will be appreciated that the solution is diluted immediately when it leaves the generator and the flash type heat exchanger since under certain conditions of partial load operation, solid salt may be present at both places. The "additionally" concentrated strong solution in the flash type heat exchanger may precipitate salt due to the additional concentration therein but the solution is immediately diluted by weak solution.

The control arrangement for the present absorption refrigeration machine is disclosed and claimed in Leonard patent application, Serial No. 2203, filed January 13, 1960, entitled Absorption Refrigeration Systems and Method of Operating the Same, now Patent No. 3,054,272, granted September 8, 1962, and in Papapanu application, Serial No. 2209, filed January 13, 1960, entitled Control Arrangement for Absorption Refrigeration Systems, now Patent No. 3,019,616, granted February 2, 1962, and reference is made to such applications for a more complete description of the control arrangement.

In FIGURE 7, I have illustrated a modification of the control arrangement which is, in effect, the control arrangement shown in FIGURE 6, reversed in the generator. In this case, under normal conditions of operation at full load, solution is discharged through outlet 79 into section 99" of box 99 and flows through pipe 95 to the far end of the generator being discharged through outlet 96 in heat exchange relation with the heating medium in tubes 32 and flows throughout the generator in contact with the heating medium in such tubes. As the load imposed upon the system begins to decrease, the pipes 95, 97 are pivoted so that some portion of the discharged weak solution flows into section 99' of the box 99; then through pipe 97 and is discharged over the tubes 32 through outlet 98; such portion of the discharged solution only flows for a short distance in heat exchange relation with the heating medium in the tubes 32. As the load continues to decrease, pipes 95, 97 are further pivoted so that eventually weak solution discharged in the generator completely bypasses the tubes 32 and flows through outlet 41 into line 42.

Considering operation of the absorption refrigeration system, it will be appreciated that at start-up, the generator contains a substantial amount of precipitated or crystallized lithium bromide salt. In some cases, it appears as if the generator tubes were covered with a pile of white snow. Solution in the remainder of the system is under extremely dilute conditions.

When the system is placed in operation, medium to be cooled is forwarded through line 14 to the tubes 7 of evaporator 6 and leaves the tubes 7 of evaporator 6 through line 15. At start-up, the pumps are actuated, pump 75 withdrawing a mixture of solutions at a concentration intermediate the concentrations of weak solution and strong solution from solution evaporator 57 and forwarding the mixture to the absorber 9, pump 78 withdrawing weak solution from the second absorber 58 after the solution has absorbed refrigerant vapor from the solution evaporator and forwarding the weak solution to the generator, the weak solution being discharged in the generator adjacent one end thereof through outlet 79. In the generator, the solution flows over the top of the salt pile gradually dissolving the solid salt and returning the concentrated or strong solution to the solution evaporator.

Refrigerant vapor is boiled from the solution in the generator 31, vapor passing to condenser 40 and being condensed therein, the condensate returning to the evaporator 6 through line 51.

Strong solution leaves the generator through outlet 41 and line 42 being discharged through nozzles 59 in the solution evaporator 57. Discharge of strong solution in solution evaporator 57 flash-cools the strong solution, the cooled strong solution immediately mixing with weak solution from the absorber supplied to the solution evaporator through line 63. Vapor so created flows through opening 61 to the second absorber 58 and is absorbed by weak solution discharged therein. The mixture of solutions from solution evaporator 57 is forwarded by pump 75 through line 77 to the absorber being discharged therein through nozzles 25 to absorb refrigerant vapor therein. Weak solution leaves the second absorber through outlet 66 and is induced by pump 78 through line 67, pump 78 forwarding the weak solution through line 74 and heat exchanger 70 to outlet 79 in the generator.

Steam condensate leaves the generator through line 37, is collected in chamber 71 and is forwarded to heat exchanger 70 where it is placed in heat exchange relation with weak solution flowing to the generator.

As previously stated, refrigerant condensate leaves condenser 42 through line 51 and is discharged in the evaporator. Pump 10 withdraws liquid refrigerant from the evaporator through line 11 and forwards the liquid refrigerant through line 13 to the nozzles 12 therein. Nozzles 12 discharge the liquid refrigerant over the tubes 7 in heat exchange relation with medium to be cooled. The liquid refrigerant is evaporated by such heat exchange relation, the vapor flowing through opening 5 to absorber 9 where it is absorbed by solution discharged in the absorber. It will be appreciated that refrigerant condensate and liquid refrigerant discharged in the evaporator is flash-cooled, immediately it is discharged into this chamber of lower pressure, the flashed vapor flowing through opening 5 to the absorber to be absorbed by solution therein.

Considering operation at full load conditions, the cooled medium rapidly cools down to design conditions and substantially all weak solution is discharged at one end of the generator in heat exchange relation with heating medium flowing through the tubes therein. Assuming the system goes in operation at partial load, as indicated by decrease in the temperature of cooled medium leaving the evaporator reflected by bulb 107, control 106 actuates motor 105 to pivot or shift the position of pipes 95, 97 to bypass some portion of the weak solution about the heating medium tubes in the generator. As more solution is bypassed or diverted about the tubes in the generator, the solution concentration in the generator gradually increases at approximately 50% load approaching the consistency of thick syrup. At approximately 25% load, it appears to be a thick slush. Even though the solution in the generator begins to increase in concentration as soon as the system begins to operate, at partial load, the solution leaving the generator is diluted to more than a safe concentration by the addition of weak solution thereto in solution evaporator 57. In one sense, the control arrangement may be considered as the circulation of solution at zero load with the addition of solid salt or slush thereto as required to provide a solution of higher concentration as load imposed upon the system increases, that is, to maintain a desired concentration in accordance with the load imposed upon the system.

It will be appreciated that the system of the present invention provides an additional increase in concentration of about 1% by means of the flash tank 54. Considering that the normal concentration range in the generator in systems heretofore commercially employed is only about 5%, this is a very significant increase in concentration. The weak solution being pumped to the generator on absorbing this flashed vapor from the strong solution, not only heats itself up by the absorbing process but also becomes more dilute by approximately 1% which tends to improve generator performance by improving the mean effective temperature difference existing in the generator.

The flash tank 54 contains liquid seals between the generator and the solution evaporator, between the absorber and the solution evaporator, and between the absorber and the second absorber. As previously stated, the vapor pressure of the hot, concentrated strong solution passing from the generator to the solution evaporator is approximately three inches mercury absolute at full load. The vapor pressure of the weak solution leaving the absorber is approximately one-quarter inch mercury absolute at full load. When these two solutions are exposed to each other in the flash tank 54, by the very nature of the flashing process, the vapor pressures of the two solutions tend to equalize. This equilibrium vapor pressure is approximately one inch mercury absolute at full load. Accordingly, in order to have the solution flow from the absorber into the flash tank, it is necessary to provide liquid seal stand pipes, in effect, constituted by line 63 and line 64.

It will be appreciated that a refrigerant economizer may be employed in the present absorption refrigeration system, if desired. Such an economizer is shown in FIGURE 8. Referring to FIGURE 8, there is shown a chamber 115 connected to condenser 40 by a line 116. Chamber 115 is also connected to the evaporator by means of line 117 and to the flash tank 54 by line 118. An intermediate pressure is available in the flash tank 54 which permits refrigerant condensate to be cooled. Refrigerant leaving condenser 40 is discharged in chamber 115 and is flash-cooled therein down to the intermediate pressure existing in flash tank 54. The cooled liquid condensate then is forwarded through line 117 to the evaporator while the flashed vapor passes through line 118 to the flash tank, being discharged in the solution evaporator or if desired, in the second absorber. This results in a 3% to 4% improvement in evaporator performance and also aids the overall cycle by adding an additional amount of preheat to the weak solution going to the generator (the additional refrigerant vapor absorbed by solution in the second absorber). Using this arrangement, condensate leaving the condenser at, say 115° F. can be flash-cooled down to approximately 80° F. in chamber 115 and then forwarded to the evaporator.

Figure 9:
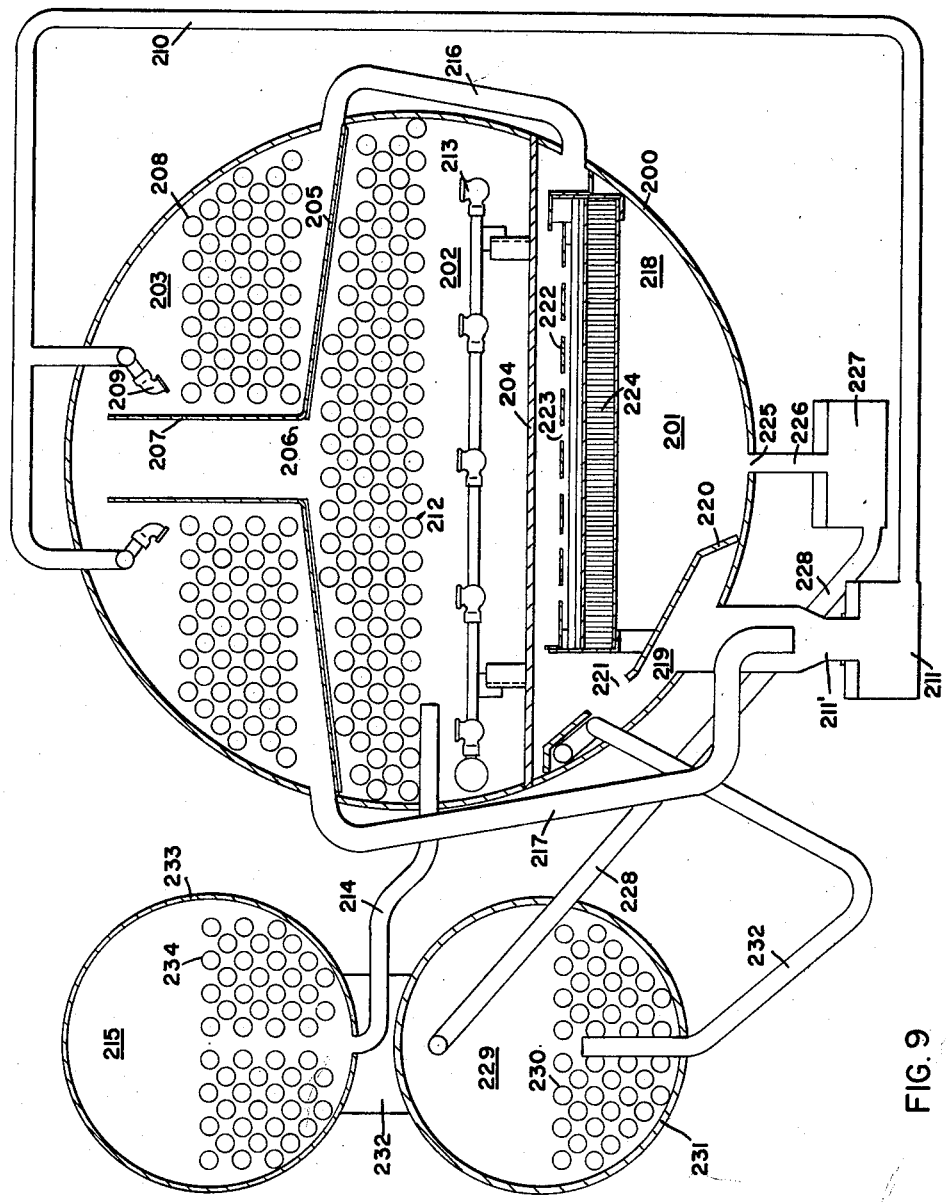
FIGURE 9 is a diagrammatic view illustrating a modified absorption refrigeration system.

In FIGURE 9, I have illustrated a modified arrangement of the absorption refrigeration system shown in FIGURES 1, 3, 4 and 5. FIGURE 9 is a diagrammatic view of the modified arrangement, only sufficient details being shown of the system to permit appreciation of the modified arrangement. Referring to FIGURE 9, there is shown a shell 200 containing a lower chamber 201 which forms the flash tank arrangement or flash type heat exchanger, an intermediate chamber 202 which comprises the evaporator, and an upper chamber 203 which comprises the absorber of the system. The flash type heat exchanger 201 is separated from the evaporator 202 by means of an insulated partition 204.

Evaporator 202 is separated from absorber 203 by an insulated partition 205 having an opening 206 therein which permits vapor from the evaporator to flow to the absorber. The walls of the opening are formed by baffle members 207 extending the length of the absorber to assure that solution in the absorber cannot return to the evaporator.

A plurality of heat exchange tubes 208 extend in absorber 203. Condensing water is passed through the tubes 208. Preferably, the tubes 208 are arranged in two sections. Nozzles 209 are placed in absorber 203 to discharge recirculated solution therein. Nozzles 209 are connected by line 210 to pump 211 connected to the flash heat exchanger 201, as hereinafter described.

A plurality of tubes 212 are placed in evaporator 202; medium to be cooled is passed through the tubes 212. A plurality of upside down spray nozzles 213 are placed in the evaporator to discharge liquid refrigerant upwardly against and among the tubes 212 in heat exchange relation with medium to be cooled passing through the tubes. Tubes 212, of course, serve as eliminators to assure that liquid droplets are not carried with the vapor to the absorber. With this construction additional eliminators are not required since, as stated, the tubes function as eliminators in addition to fulfilling their primary purpose as heat exchange surface.

Nozzles 213 are connected to the discharge side of the evaporator pump (not shown), the suction side of the pump being connected to the sump of the evaporator to permit liquid refrigerant to be circulated about the evaporator and discharged therein in heat exchange relation with medium to be cooled passing through the tubes 212. It will be appreciated, liquid refrigerant discharged in the evaporator is flash-cooled, the flashed vapor flowing to the absorber 203. The evaporator is also connected by a line 214 to the condenser 215 to permit liquid condensate to be returned to the evaporator and flash-cooled therein.

The absorber 203 is connected to the flash type heat exchanger 201 by lines 216 and 217. The flash type heat exchanger 201 is divided into chambers 218 forming a second absorber and chamber 219 forming a solution evaporator. The solution evaporator 219 is connected to absorber 203 by line 217, and is connected to the suction side of pump 211 by line 211'. Pump 211, as previously stated, forwards weak solution mixed with the flash-cooled strong solution to the absorber 203 through line 210.

The second absorber 218 is connected to absorber 203 by line 216. Partition 220 separates the second absorber and the solution evaporator, these chambers being in communication however, through a suitable opening 221 in partition 220. A spray deck 222 is provided in the second absorber 218 having distribution openings 223 therein. Suitable fill material 224, which may be Raschid rings, Beryl saddles or other suitable fills or packings such as those disclosed in United States Patent Nos. 2,809,818 and 2,809,817, both granted October 15, 1957, in the name of Carl Georg Munters, may be employed to expose the solution to a large surface area. Absorption of flashed vapor takes place on the surface of these rings or on the surface of the droplets of liquid solution.

The second absorber has an outlet 225 therein connected by line 226 to pump 227. Pump 227 forwards the weak solution containing the refrigerant vapor absorbed in the second absorber through line 228 to the generator 229.

Generator 229 is formed by a plurality of tubes 230 through which heating medium passes disposed in a shell 231. The generator is connected to condenser 215 by a conduit 232 to permit vapor boiled off in the generator to pass through the conduit to condenser 215 and to be condensed therein. Weak solution forwarded to generator 229 by pump 227 through line 228 is discharged therein over the tubes 230. Strong solution leaves the generator through line 232 and is discharged in the solution evaporator 219, the strong solution being flash-cooled in the solution evaporator, the cooled strong solution immediately mixing with weak solution supplied therein through line 217 from the absorber while the flashed vapor passes through opening 221 in partition 220 and is absorbed by weak solution in the second absorber 218.

Condenser 215 is formed by a shell 233 containing a plurality of tubes 234 through which condensing water passes. Condensing water, of course, passes through the tubes of absorber 203 and is then forwarded through the tubes of condenser 215 by a pump (not shown).

No control arrangement has been shown in this diagrammatic flow diagram. It will be appreciated that the control arrangement previously described may be employed or any other suitable control arrangement may be used.

The operation of the modified system is similar to the operation of the system previously described with reference to FIGURE 1. It will be appreciated the basic distinctions of the system shown in FIGURE 9 and the system previously described reside in the construction of the absorber, evaporator and flash type heat exchanger, these elements being placed in the same shell.

FIGURES 10 and 11 illustrate a modified arrangement of the system shown in FIGURE 9. Generally, the absorber-evaporator-flash-type heat exchanger construction is the same. In this case, however, the nozzles 213' discharge downwardly over the tube bundle 212 and eliminators 240 are provided to assure that droplets of liquid refrigerant are not carried with the vapor to the absorber.

In FIGURES 10 and 11, certain elements of the purge arrangement 81 are shown which are not shown in prior figures. For example, a tube 241 is provided in absorber 203 under the spray nozzles 209' to receive a minor portion of solution therefrom. This minor portion of solution flows through a container 242 and line 243 to the purge line from which it is induced into the purge tank. In other respects, the modified system is substantially the same as systems previously described.

The present invention provides an absorption refrigeration system employing lithium bromide solution as an absorbent which is, for practical operating purposes, substantially solidification-proof in the liquid to liquid heat exchanger. No problem concerning solidification exists at full load. In prior systems, it was necessary to employ a condensing water bypass and to adjust the maximum concentration at full load.

It will be appreciated, of course, that crystallization occurs in the generator and such crystallization is essential for control purposes, employing the control arrangement described. Under these circumstances, control of the temperature of entering condensing water is eliminated, thus eliminating an expensive regulating valve and a cooling tower bypass.

A major advantage of the present absorption refrigeration system resides in the greatly reduced overall solution charge. A machine which is low in height may be designed thus reducing machine cost. Smaller pumps may be employed, thus reducing electrical requirements. Since substantial heat exchange surface may be eliminated, a lighter machine is provided.

An advantage of the present invention resides in the fact that a refrigerant economizer may be employed which results in a substantial improvement in evaporator performance and also aids the overall cycle by adding an additional amount of preheat to the weak solution going to the generator. The flash type heat exchanger creates an intermediate pressure level so that refrigerant can be flash-cooled thus improving cycle efficiency.

In the present invention, the concentration range in the absorber is automatically increased by about 1% without increasing steam pressure requirements in the generator permitting less absorber heat transfer surface to be employed or resulting in more machine capacity as desired.

In the present system, there is no need for limiting and adjusting the maximum solution concentration since solidification problems have been practically eliminated; too, the amount of concentrated solution in the cycle is reduced substantially resulting in a much shorter dilution period at shut-down.

The present absorption refrigeration system requires little or no field application engineering installation or the like. The system is factory engineered, factory installed and factory tested.

In the present system, 12 pounds of steam or less is employed for all load conditions, so that engineering time need not be used in field installation in developing varying steam conditions under partial load operations. Since steam pressures remain constant under all load conditions, corrosion problems due to introduction of air into the steam condensate system under partial load conditions do not arise. No need exists for automatic or manual steam valves during normal operation, although, if desired, of course, a reducing valve may be provided, since the solid salt deposit around the generator tube bundle at partial load acts as an excellent heat insulator.

With the control arrangement illustrated, solidification of salt in the generator is employed to provide cheaper and more efficient control of operation during conditions at partial load operation. Solution problems or storage problems are minimized since the solution is diluted by removing solid salt and not by diluting the entire charge.

While I have described preferred embodiments of the invention, it will be appreciated the invention is not so limited since it may be otherwise embodied within the scope of the following claims.

I claim:

1. In an absorption refrigeration system, the combination of a generator, a condenser, an absorber, means for heating weak solution in the generator to form refrigerant vapor and strong solution, the generator being in communication with the condenser so that refrigerant vapor created therein passes to the condenser, a refrigerant evaporator in communication with the condenser to receive condensate therefrom, condensate in the evaporator being flash-cooled, the flashed vapor created in the evaporator passing to the absorber to be absorbed by solution therein, a solution evaporator in communication with the generator to receive strong solution therefrom, a second absorber having a pressure therein intermediate the pressures in the generator and the first absorber, pressure in the solution evaporator being substantially the same as pressure in the second absorber, vapor created in the solution evaporator passing to the second absorber to be absorbed by solution therein, the second absorber being in communication with the first absorber to receive solution therefrom and in communication with the generator to supply solution thereto.

2. An absorption refrigeration system according to claim 1 in which means are provided to supply weak solution from the second absorber to the generator, weak solution passing from the second absorber to the generator being place in heat exchange relation with heating medium after its passage through the generator.

3. An absorption refrigeration system according to claim 2 in which weak solution passing from the second absorber to the generator is placed in heat exchange relation with steam condensate from the generator.

4. An absorption refrigeration system according to claim 1 in which a chamber is provided in a condensate line connecting the condenser and the refrigerant evaporator, said chamber being connected to the second absorber to maintain a pressure in said chamber less than condenser pressure and greater than evaporator pressure, condensate discharged in said chamber being flash-cooled, vapor passing to the second absorber and cooled condensate passing to the refrigerant evaporator.

5. An absorption refrigeration system according to claim 4 in which means are provided to supply weak solution from the second absorber to the generator, weak solution passing from the second absorber to the generator being placed in heat exchange relation with heating medium after its passage through the generator.

6. An absorption refrigeration system according to claim 5 in which weak solution passing from the second absorber to the generator is placed in heat exchange relation with steam condensate from the generator.

7. In an absorption refrigeration system, the combination of a generator, a condenser, an absorber, means for heating weak solution in the generator to form refrigerant vapor and strong solution, the generator being in communication with the condenser so that refrigerant vapor created therein passes to the condenser, a refrigerant evaporator in communication with the condenser to receive condensate therefrom, condensate in the evaporator being flash-cooled, the flashed vapor created in the evaporator passing to the absorber to be absorbed by solution therein, a solution evaporator in communication with the generator to receive strong solution therefrom, strong solution discharged in the solution evaporator being flash-cooled, a second absorber having a pressure therein intermediate the pressures in the generator and the first absorber, pressure in the solution evaporator being substantially the same as pressure in the second absorber, vapor created in the solution evaporator passing to the second absorber to be absorbed by solution therein, and means for mixing solution from the first absorber and solution discharged in the solution evaporator for supply to the first absorber, and means for supplying the solution mixture to the first absorber, the second absorber being in communication with the first absorber to receive solution therefrom and in communication with the generator to supply solution thereto.

8. In an absorption refrigeration system, the combination of a generator, a condenser, an absorber, means for heating weak solution in the generator to form refrigerant vapor and strong solution, the generator being in communication with the condenser so that refrigerant vapor created therein passes to the condenser, a refrigerant evaporator in communication with the condenser to receive condensate therefrom, condensate in the evaporator being flash-cooled, the flashed vapor created in the evaporator passing to the absorber to be absorbed by solution therein, a solution evaporator, a line connecting the generator to the solution evaporator to forward strong solution thereto from the generator, solution discharged in the solution evaporator being flash-cooled, a second absorber having a pressure therein intermediate the pressures in the generator and the first absorber, pressure in the solution evaporator being substantially the same as pressure in the second absorber, vapor created in the solution evaporator passing to the second absorber to be absorbed by solution therein, a line connecting the first absorber with the solution evaporator to supply solution from the first absorber to the solution evaporator for admixture with cooled strong solution, a line connecting the first absorber with the second absorber to forward solution from the first absorber to the second absorber, and a line connecting the second absorber with the generator to supply weak solution thereto.

9. In an absorption refrigeration system, the combination of a generator having a desired pressure therein, a condenser having substantially the same pressure therein as exists in the generator, means for heating weak solution in the generator to form refrigerant vapor and strong solution, the vapor passing to the condenser and being condensed therein, a refrigerant evaporator having a pressure less than condenser pressure, an absorber in communication with the refrigerant evaporator having a pressure less than generator pressure, a shell, a solution evaporator in said shell having a pressure intermediate generator pressure and absorber pressure, a second absorber in said shell in communication with the solution evaporator having a pressure intermediate generator pressure and absorber pressure, strong solution from the generator being flash-cooled in the solution evaporator, vapor from the solution evaporator passing to the second absorber and being absorbed by solution therein, means for supplying solution from the second absorber to the generator, means for mixing flash-cooled strong solution with solution having a less concentration of absorbent, means for supplying the solution mixture to the first absorber, and means for supplying solution from the first absorber to the second absorber to absorb vapor therein.

10. An absorption refrigeration system according to claim 9 in which control means are provided to regulate operation of the system in response to load imposed upon the system.

11. An absorption refrigeration system according to claim 10 in which the refrigerant evaporator and first absorber are placed in a shell, the first absorber being placed above the refrigerant evaporator and in communication therewith.

12. An absorption refrigeration system according to claim 11 in which a heat exchanger is provided to place weak solution passing from the second absorber to the generator in heat exchange relation with heating medium after its passage through the generator.

13. An absorption refrigeration system according to claim 12 in which weak solution passing from the second absorber to the generator is placed in heat exchange relation with steam condensate from the generator.

14. An absorption refrigeration system according to claim 13 in which the second absorber is placed at a level below the level of the first absorber, and a line is provided connecting the first absorber with the second absorber, sufficient liquid head being maintained in said line during operation of the system to seal the first absorber from the second absorber.

15. An absorption refrigeration system according to claim 14 in which a line is provided connecting the solution evaporator and the generator, a loop being provided in such line to maintain the desired pressure difference between the generator and the solution evaporator.

16. An absorption refrigeration system according to claim 15 in which a chamber is provided in a condensate line connecting the condenser and the evaporator, said chamber being connected to the second absorber to maintain a pressure in said chamber less than condenser pressure, condensate discharged in said chamber being flash-cooled, vapor passing to the second absorber and cooled condensate passing to the refrigerant evaporator.

17. In an absorber-evaporator arrangement for use in an absorption refrigeration system, the combination of a shell, a barrier separating the shell into two chambers in communication with one another, the first chamber forming a solution evaporator and being adapted to be connected to the generator of the system to receive strong solution therefrom, said chamber being adapted to be maintained at a pressure less than generator pressure during operation of the system whereby strong solution discharged therein is flash-cooled, the first chamber being adapted to be connected to the absorber of the system to receive solution therefrom to mix with flash-cooled solution and to return the mixture to the absorber of the system, the second chamber receiving vapor from the first chamber, said second chamber being adapted to be connected to the absorber of the system to receive solution therefrom and to the generator to supply weak solution thereto, solution in the second chamber absorbing vapor therein created in the first chamber.

18. In an absorber-evaporator arrangement for use in an absorption refrigeration system, the combination of a shell, an absorber in said shell including a plurality of tubes through which a cooling medium passes, an evaporator in said shell in communication with the absorber to permit vapor created therein to pass to the absorber to be absorbed by solution in the absorber, a solution evaporator in said shell adapted to be placed in communication with the generator of the absorption refrigeration system to receive strong solution therefrom, the solution evaporator during operation of the system being at a pressure less than generator pressure whereby strong solution discharged therein in flash-cooled, a second absorber in the shell in communication with solution evaporator and the first absorber, said second absorber being adapted to receive solution from the first absorber and vapor from the solution evaporator during operation of the system, solution in the second absorber absorbing vapor therein, the second absorber being adapted to communicate with the generator of the system to permit solution after vapor absorption to be supplied to the generator of the system.

19. An absorber-evaporator arrangement according to claim 18 in which a line provides communication between the absorber and the solution evaporator, a liquid head being maintained in said line during operation of the system to permit solution to flow from the absorber to the solution evaporator.

20. An absorber-evaporator arrangement according to claim 19 in which a line provides communication between the second absorber and the first absorber, a liquid head being maintained in said line during operation of the system to permit solution to flow from the first absorber to the second absorber.

21. An absorber-evaporator arrangement according to claim 20 in which the absorber is placed adjacent the top of the shell and the evaporator is placed below the absorber.

22. An absorber-evaporator arrangement according to claim 21 in which the second absorber and the solution evaporator are placed below the evaporator in the shell.

23. An absorber-evaporator arrangement according to claim 22 in which the second absorber and the solution evaporator are placed side by side in the shell.

24. An absorber-evaporator arrangement according to claim 23 in which an insulating partition separates the evaporator from the solution evaporator and the second absorber.

25. In an absorption refrigeration system, the combination of a shell containing a generator, a second shell containing a condenser, the generator being in communication with the condenser so that referigerant vapor created therein passes to the condenser, means for heating weak solution in the generator to form referigerant vapor and strong solution, a third shell containing an absorber-evaporator arrangement, the absorber-evaporator arrangement including a first absorber, a plurality of tubes in the first absorber through which a cooling medium passes, an evaporator in communication with the first absorber to permit vapor created therein to pass to the first absorber to be absorbed by solution in the first absorber, a solution evaporator in communication with the generator to receive strong solution therefrom, the solution evaporator during operation of the system having a pressure less than generator pressure whereby strong solution discharged therein a flash-cooled, and a second absorber in communication with the solution evaporator and the first absorber, said second absorber receiving solution from the first absorber and vapor from the solution evaporator, solution in the second absorber absorbing vapor therein, the second absorber being in communication with the first absorber to permit solution after vapor absorption to return to the first absorber.

26. An absorption refrigeration system according to claim 25 in which a line provides communication between the first absorber and the solution evaporator, a liquid head being maintained in the line to permit solution to flow from the first absorber to the solution evaporator.

27. An absorption refrigeration system according to claim 26 in which a line provides communication between the first absorber and the second absorber, a liquid head being maintained in said line to permit solution to flow from the first absorber to the second absorber.

28. In an absorber-evaporator arrangement for use in an absorption refrigeration system, the combination of a shell, a barrier separating the shell into two chambers in communication with one another, the first chamber forming a solution evaporator and being adapted to be connected to the generator of the system to receive strong solution therefrom, said chamber being adapted to be maintained at a pressure less than generator pressure during operation of the system whereby strong solution discharged therein is flash-cooled, the first chamber being adapted to be connected to the absorber of the system to receive solution therefrom to mix with flash-cooled solution and to return the mixture to the absorber of the system, the second chamber receiving vapor from the first chamber, said second chamber being adapted to be connected to the generator to supply weak solution thereto, solution in the second chamber absorbing vapor therein created in the first chamber.

29. In the method of operation of an absorption refrigeration system, the steps which consist in placing weak solution in the generator in heat exchange relation with a heating medium to vaporize refrigerant from the solution thus forming a strong solution, forwarding the vapor to a condenser, condensing the vapor, forwarding the refrigerant condensate to an evaporator at a pressure less than pressure in the condenser, flash-cooling the condensate in the evaporator, vapor formed in the evaporator passing to an absorber to be absorbed by solution therein, placing the cooled refrigerant condensate in heat exchange relation with a medium to be cooled, forwarding strong solution from the generator to a solution evaporator at a pressure less than generator pressure, flash-cooling the solution in the solution evaporator, mixing the flash-cooled solution with absorber solution, absorbing the flashed vapor in solution and forwarding the solution to the generator.

30. In the method of operation of an absorption refrigeration system, the steps which consist in placing weak solution in the generator in heat exchange relation with a heating medium to vaporize refrigerant from the solution thus forming a strong solution, forwarding the vapor to a condenser, condensing the vapor, forwarding the refrigerant condensate to an evaporator at a pressure less than pressure in the condenser, flash-cooling the condensate in the evaporator, vapor formed in the evaporator passing to an absorber to be absorbed by solution therein, placing the cooled refrigerant condensate in heat exchange relation with a medium to be cooled, forwarding strong solution from the generator to a solution evaporator at a pressure less than generator pressure, flash-cooling the solution in the solution evaporator, mixing the flash-cooled solution with absorber solution, vapor from the solution evaporator passing to a second absorber, forwarding solution from the first absorber to the second absorber to absorb vapor from the solution absorber thus forming weak solution, and forwarding the weak solution to the generator.

31. A method of operation of an absorption refrigeration system according to claim 30 which includes the step of forwarding the mixed solution from the solution evaporator to the first absorber.

32. A method of operation of an absorption refrigeration system according to claim 31 which includes the step of placing the weak solution in heat exchange relation with heating medium after its passage through the generator and prior to the discharge of the weak solution in the generator.

33. A method of operation of an absorption refrigeration system according to claim 32 in which steam is employed as a heating medium in the generator and the weak solution is placed in heat exchange relation with steam condensate.

34. A method of operation of an absorption refrigeration system according to claim 32 which includes the step of automatically controlling operation of the system in response to load imposed upon the system.

35. A method of operation of an absorption refrigeration system according to claim 34 which includes the step of flash-cooling refrigerant condensate during its passage between the condenser and the evaporator.

36. In the method of operation of an absorption refrigeration system, the steps which consist in placing weak solution in the generator in heat exchange relation with a heating medium to vaporize refrigerant from the solution thus forming a strong solution, forwarding the vapor to a condenser, condensing the vapor, forwarding the refrigerant condensate to an evaporator at a pressure less than pressure in the condenser, flash-cooling the condensate in the evaporator, vapor formed in the evaporator passing to an absorber to be absorbed by solution therein, placing the cooled refrigerant condensate in heat exchange relation with a medium to be cooled, forwarding strong solution from the generator to a solution evaporator at a pressure less than generator pressure, flash-cooling the solution in the solution evaporator, mixing the flash-cooled solution with absorber solution, vapor from the solution evaporator passing to a second absorber, forwarding solution from the first absorber to the second absorber to absorb vapor from the solution absorber thus forming weak solution, forwarding the weak solution to the generator, and cooling the condensate during its passage between the condenser and the evaporator.

37. A method of operation of an absorption refrigeration system according to claim 36 in which the condensate is flash-cooled by discharge in an area having a pressure less than condenser pressure and greater than evaporator pressure, the flashed vapor being forwarded to the second absorber for absorption by solution therein, the cooled condensate being forwarded to the evaporator.

38. A method of operation of an absorption refrigeration system according to claim 37 which includes the step of placing weak solution in heat exchange relation with heating medium after its passage through the generator and prior to the discharge of the weak solution in the generator.

39. In the method of operation of an absorption refrigeration system, the steps which consist in placing weak solution in heat exchange relation with heating medium in a chamber having a desired pressure to vaporize refrigerant and to form strong solution, removing the vapor from said chamber, forwarding the strong solution to a second chamber having a pressure less than pressure in the first chamber to flash-cool the solution, forwarding flashed vapor from the second chamber to a third chamber having a pressure similar to pressure in the second chamber and simultaneously mixing the solution with a solution having a more dilute concentration, forwarding the mixed solution to an absorber, discharging the mixed solution in the absorber, forwarding solution from the absorber to the third chamber, absorbing vapor in the third chamber in solution therein to form a weak solution, and forwarding the weak solution to the first chamber.

References Cited in the file of this patent

UNITED STATES PATENTS

| | | |
|---|---|---|
| 2,352,814 | Thomas | July 4, 1944 |
| 2,430,047 | Edberg | Nov. 4, 1947 |
| 2,452,699 | Sutton | Nov. 2, 1948 |
| 2,561,369 | Hellstrom | July 24, 1951 |
| 2,565,838 | Berestneff et al. | Aug. 28, 1951 |
| 2,645,908 | Backstrom | July 21, 1953 |
| 2,654,229 | Shagaloff | Oct. 6, 1953 |
| 2,724,246 | Lowe | Nov. 22, 1955 |
| 2,733,575 | Leonard | Feb. 7, 1956 |
| 2,847,832 | Johnson | Aug. 19, 1958 |
| 2,948,124 | Embury | Aug. 9, 1960 |